(12) United States Patent
Marques et al.

(10) Patent No.: US 11,181,697 B2
(45) Date of Patent: Nov. 23, 2021

(54) APPARATUS, SYSTEM AND METHOD FOR CONNECTOR AND PORT MANAGEMENT

(71) Applicant: Xieon Networks S.a.r.l., Luxembourg (LU)

(72) Inventors: Carlo Marques, Lisbon (PT); Nuno Ferreira, Lisbon (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/731,802

(22) Filed: Dec. 31, 2019

(65) Prior Publication Data
US 2021/0199894 A1 Jul. 1, 2021

(51) Int. Cl.
*G02B 6/38* (2006.01)

(52) U.S. Cl.
CPC .................... *G02B 6/385* (2013.01)

(58) Field of Classification Search
CPC .............................. G02B 6/385; G02B 6/3895
See application file for complete search history.

(56) References Cited

U.S. PATENT DOCUMENTS

| 9,476,795 B1* | 10/2016 | Cogger | G01M 11/088 |
| 2016/0141828 A1* | 5/2016 | Ahmadi | G02B 6/024 |
| | | | 359/337.4 |
| 2016/0282604 A1* | 9/2016 | Yoshino | G02B 23/2469 |

* cited by examiner

*Primary Examiner* — Omar R Rojas

(57) ABSTRACT

The disclosed apparatus, system and method of the present invention provides improved solutions related to the interconnection of communication cable connectors and communication port receptacles, and more generally, for improved handling and management of communication cable connectors and communication ports. Certain example embodiments suitable for an optical communication application, for example, provide for improved laser safety at the location of an optical communication connector and/or an optical communication port. Moreover, certain example embodiments of the present invention additionally or alternatively otherwise provide for improved communication port, module, device, and/or system handling, administration and/or other management.

20 Claims, 13 Drawing Sheets

APPARATUS, SYSTEM AND METHOD FOR CONNECTOR AND PORT MANAGEMENT

BACKGROUND

The invention relates in general to the field of communication cable connectors and receptacles that receive or otherwise engage communication cable connectors. In the area of optical communication equipment, for example, such cables can include for example and without limitation optical fiber cables, and such receptacles can include for example and without limitation optical port receptacles at which cable-terminating connectors are received into or otherwise engaged with a port location to optically couple the end of an optical fiber cable to another optical path or component of the communication device or system. More specific examples of such receptacles include without limitation optical fiber adapters or receptacles that establish port connection locations on the front panel or faceplate of communication system modules, or optical fiber adapters or receptacles for pluggable optical devices such as for example transponders or transceivers, just to name a few.

In the example of optical fiber adapters, known optical fiber adapters of the prior art for example can be a substantially rectangular-bodied device wherein a first end of the adapter serves to removably receive an optical fiber connector, including a first optical fiber cable end ferrule, or a first pair of ferrules such as can be the case for example with a duplex LC or SC connector, while a second opposing end of the adapter may serve to receive another optical fiber connector including a second ferrule, or pair of ferrules, associated with one or more other optical fiber cable ends that is/are to be optically coupled with the optical fiber cable end(s) associated with the first ferrule or ferrule pair. In this way, this example prior art adapter receives into a first end of the adapter at least one connector including one or more ferrules and respectively aligns, along a common axis within the adapter, each respective optical fiber end with a corresponding optical fiber end received into the adapter from the opposing end of the adapter. Accordingly, such an example prior art adapter serves to facilitate an optical coupling for the communication of one or more optical communication signals between one optical fiber cable or fiber cable pair and another optical fiber cable or fiber cable pair.

Other forms of known receptacles include, for example and without limitation, other configurations of optical adapters and electrical adapters, as well as receptacles that removably receive or otherwise engage an optical or electrical communication cable connector so as to operatively couple the received or otherwise engaged communication cable with a device other than another communication cable, in a way that facilitates optical or electrical communication there between.

Communication system modules or cards of the prior art for example have incorporated adapters such as these within their front panels or faceplates. In the example of an optical communication system module, when such a module is placed within a shelf of a communication system, such adapters serve to establish the locations of optical ports of the optical communication system to which communication system operators can, from a system operator side of the module front panel or faceplate, removably engage and thereby couple one or more optical fibers using one or more optical fiber connectors. Such modules of the prior art sometimes further provide a separate indicator, such as a light-emitting diode (LED) indication, located on the module panel for example to indicate to a system operator one or more mode(s), state(s), status, and/or other operational characteristic(s) of a given communication port or ports.

The absence of engagement of a communication cable in a given receptacle can present concerns for at least certain types of communication equipment, such as for example optical communication equipment that employ lasers communicating at power levels that can hazardous to eye safety at the point of any open connections in an operating optical communication path. Prior art systems having knowledge of, or that can recognize, any open or incomplete connection or other break along a given optical path can take steps to mitigate such eye safety risks and hazards, such as for example by not enabling, or by turning off or down, the laser upon detection of any such incongruity along the optical path.

Various prior art systems thus have employed solutions to monitor the optical communication path itself so as to help determine when a laser should be turned down or off, and/or when it is safe to power-up a laser. Other prior art solutions instead are based on local detections related to the optical connections themselves. For example, certain known approaches within the prior art are realized through optical fiber cable connectors that include an electrically conductive plate, sheath or armor positioned around the fiber core within the connector. Such an electrically conductive component serves to close an otherwise open electrical circuit presented by, for example, the receptacle into which the connector is received. Similarly, in other implementations an electrically conductive component might alternatively close an otherwise open connection presented through the cable itself by equipment to which another end of the cable is connected. Either way, the closed electrical circuit in turn indicates the presence or engagement of the connector to associated equipment, such as for example a communication network element system module into which the associated cable is connected. These solutions are not pervasively deployed in the industry, however. Such solutions can be bulky, unreliable, and otherwise impractical for many applications.

SUMMARY

The apparatus, system and method of the present invention provides improved solutions for the interconnection of a connector and a cooperating receptacle, and more generally, for improved handling and management of communication connectors and communication ports. Certain embodiments of the present invention for example enable associated communication equipment to verify, or confirm, the engagement of a connector at a given receptacle, for laser safety and/or other purposes. Moreover, certain embodiments for example may instead or additionally enable associated communication equipment to recognize or identify a given engaged connector, connector type, connector class, or connector functionality, or enable associated communication equipment to at least distinguish a given engaged connector from one or more alternative connectors, connector types, connector classes, or connector functionalities. Such alternative connectors, connector types, connector classes, or connector functionalities may nevertheless share the same form factor, for example, as the given identified or distinguished connector.

The present invention enables these and other functionalities and features for example through, in the example embodiment described further below, an innovative component of a connector that is adapted, or in other words operable, to cooperate or otherwise interact with or influence light that is presented to the connector component when the connector is engaged into position with a cooperating receptacle. Cooperation or other interaction/influence between the receptacle and the component of the connector, and/or the absence of such cooperation or interaction or influence, for example can thereby be used to enable various of such functionalities and features. In the example embodiment described further below, the connector component of the present invention is also disposed and adapted (i.e., operable) to, when the connector is engaged into position at a receptacle of the present invention, provide a visual indication on the operator side of the receptacle and connector that for example can serve to confirm connector engagement, or provide other status related to the connector, and/or the port, and/or the port connection, for example. Such visual indication can be, for example, provided by an optical portion of a connector component that faces the operator and which illuminates as a result of light introduced into the connector component once the connector is engaged in position.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, so as to more clearly depict and allow emphasis to instead be placed upon various elements of the illustrated example embodiments that are described in further detail below.

DETAILED DESCRIPTION

Figure 1:
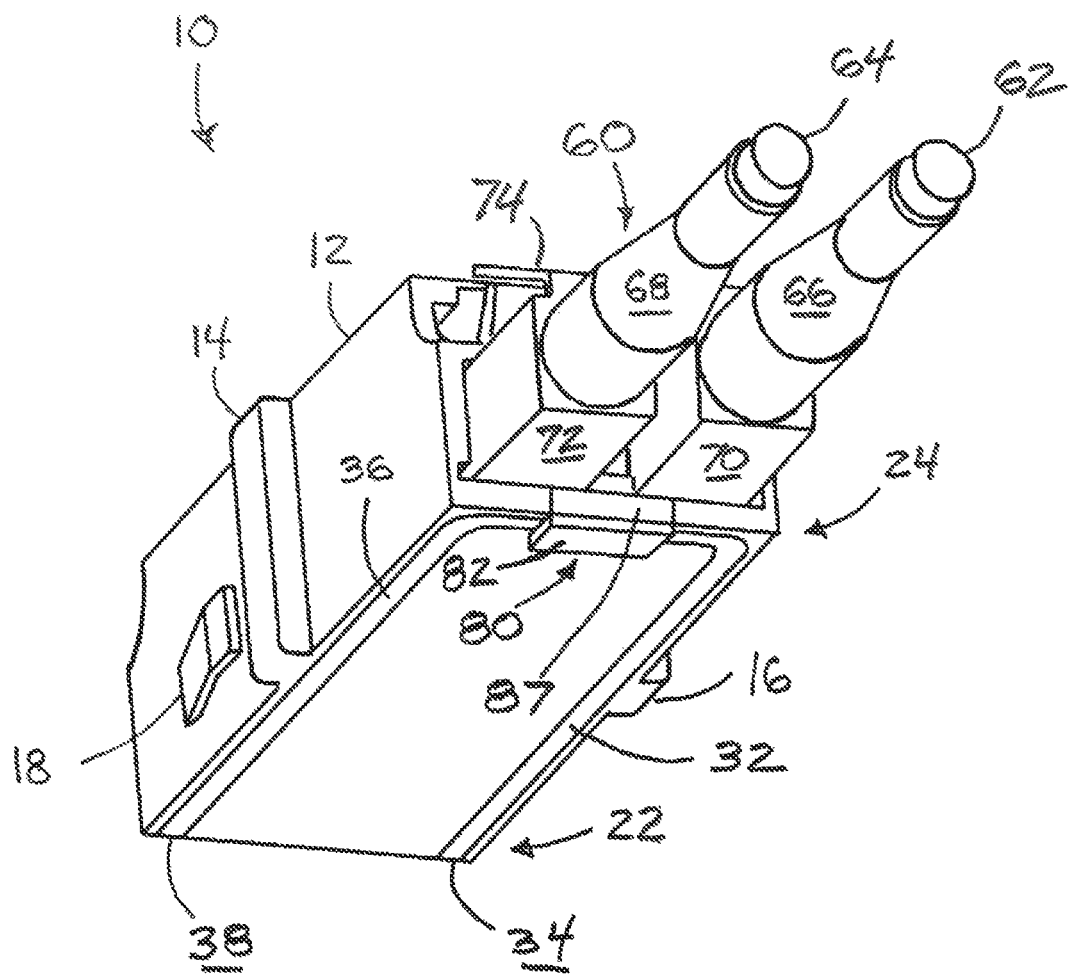
FIG. 1 is a bottom-up perspective view of an example embodiment of the present invention comprising a dual-bore/cavity, or duplex, optical fiber connector adapter and a cooperating optical fiber connector disposed at an end of an optical fiber pair (only representative portions of such fibers being illustrated) properly received into and thus engaged at a first end of the adapter to facilitate optical connectivity with another optical fiber pair (not shown) the adapter is adapted to receive into a second end (obscured from view in FIG. 1) of the adapter.

A description of one or more example embodiments of the invention follows.

Illustrated in the figures is an example embodiment of the present invention that includes an optical fiber connector adapter 12 and a cooperating optical fiber connector 60, as well as an optical emitter 90 and optical detector 92 discussed further below. Each of the connector 60 and adapter 12 is adapted (i.e., operable) for removable receipt of the connector 60 into a first end 24 of the adapter 12, so as to engage the connector 60 at the adapter 12 and facilitate an optical port connection at the location of the adapter 12.

More specifically, each of connector body portions 70 and 72 of the duplex connector 60 terminates an optical fiber of an optical fiber pair 62 and 64. Such portions 70 and 72 are each received into the adapter 12, and more specifically into each of respective bores, or cavities, 26 and 28, at a first end 24 of the adapter 12. In this particular embodiment that comprises a receptacle having the particular characteristics of dual-bore/cavity adapter 12, the adapter 12 is further adapted to receive a second optical fiber pair (not shown in the figures), through a second connector (also not shown) that is received into the second end 22 of the adapter 12. In this example, the adapter 12 serves to retain and align the connector 60 (including its associated optical fibers and ferrules therein), which for example is received into the adapter 12 from a system operator side, so as to optically couple optical fibers 62 and 64 with respective optical fibers (not shown) terminated by the second connector (not shown), in a manner that is already well understood and appreciated by those skilled in the art.

From both a mechanical and optical communication perspective, the adapter 12 serves, at a very fundamental level, to receive, align and optically couple the one or more terminated optical paths presented by one or more optical fiber connectors on a first side or end 24 of the adapter 12, on one hand, with corresponding one or more terminated optical paths presented by one or more optical fiber connectors on a second side or end 22 of the adapter 12, on the other hand. In this example embodiment, adapter 12 is adapted to be retained within an aperture of a module panel or other enclosure (see FIG. 12 for an example schematic illustration in the context of a faceplate 102 of a system module 100), as a result of a pressure fit created by flanges 14 and 16, disposed on one side of the panel/enclosure, and deformable panel clips or latches 18 and 20 disposed on the other side of the panel/enclosure, in a manner known to those skilled in the art. In this manner, a first, or front, end 24 of example adapter 12 is situated on a first side (sometimes referred to as the system operator side) of the panel/enclosure of an example communication system module, while the second, or back, end 22 of adapter 12 is situated on the other side of the panel/enclosure (sometimes referred to in the art as the printed circuit board, or PCB, side).

Figure 12:
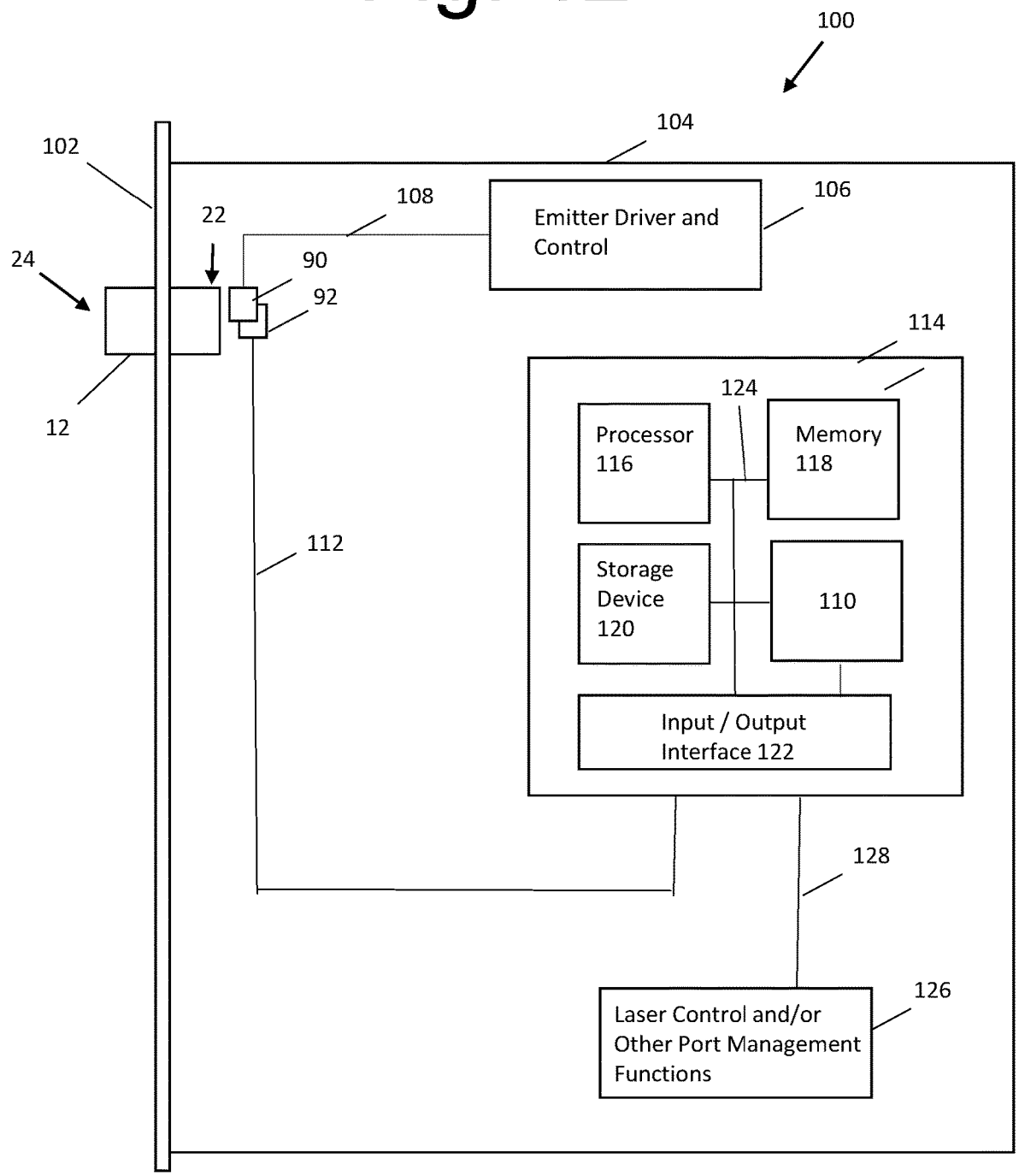
FIG. 12 is a representative side view of an example module in accordance with the present invention, depicted only schematically, so as to further identify and illustrate certain example structures and functional blocks relating to the example embodiment of the present invention illustrated in other of the Figures and described herein.

FIG. 12 presents one example illustration of a system module 100 having a faceplate 102 on which adapter 12 is affixed. In this example, to a system operator adapter 12, and in particular end 24 of adapter 12, serves as a communication port location on an operator side of faceplate 102 of module 100. On the other side, or PCB side, of the faceplate 102 is where the PCB 104 of the system module 100 is located.

In this illustrated example, the system operator side of the panel/enclosure serves as the side or end 24 of the illustrated adapter 12 through which, when installed into a panel or enclosure, one or more optical fibers can be patched by the system installer or system operator so as to be removably coupled at the adapter 12 to one or more corresponding communication path(s) of the module or other device. Such other kinds of devices may include, for example and without limitation, pluggable communication system devices, such as for example a pluggable optical transceivers, transmitters, transponders and receivers. Such pluggable form factors may include industry-standard form factors such as for example small form-factor pluggables (SFPs), QSFP (Quad Small Form-Factor Pluggable), CFP2, CFP4, and CFP8. Industry-standard pluggable form factors, of which the foregoing are non-limiting examples, are herein generically and short-handedly referred to as FPs in the plural form, or FP in the singular form.

In the example of a communication module that is received into a slot on a shelf of a larger communication system, such as for example a communication network node or element, the adapter 12 can serve as one or more communication ports on a module front panel or faceplate that is accessible to a system operator once such module is in place in the slot of the shelf of the communication system, whereas the other side of the panel/enclosure is where optical fibers that belong to the module itself for example can be received by adapter 12 by insertion of one or more connectors into end 22 for example during module manufacture, assembly or installation.

In this way, example adapter 12 can serve as a point of interface on for example a front panel of a module of a communication system or other device enclosure. For instance, duplex adapter 12 could be used to support both the transmit (Tx) and receive (Rx) subsections of an optical communication port wherein the Tx subsection is associated with a first cavity of the two cavities 26 and 28, while the Rx subsection is associated with the other of the two cavities 26 and 28. Except for those instances herein where it is otherwise specified, however, generally speaking the term "port" as used herein is not intended to set forth a narrower definition of the term as compared to what is ordinarily understood by those of skill in the art, and thus for example by itself the term "port" as used herein is not limited to applications that are optical, nor is it limited to those applications that are duplex in nature or have a Tx subsection associated with a first cavity and a separate Rx subsection associated with a second cavity, nor is it limited to those applications having both Tx and Rx functionality, just to list without limitation a few illustrative examples of how the present invention is not limited by the example embodiments described herein.

Those skilled in the art will recognize that a given receptacle of the sort such as example adapter 12 can be formed from known materials already used in the manufacture of adapters and other receptacles, such as for example a fiberglass or polymer material. In this example embodiment, adapter 12 comprises an injection molded body that, among other things, serves to establish cavities 26, 28, 48 and 50 for the received connectors, as well as retaining flanges 14 and 16 that cooperate with adapter retaining latches 18 and 20, as described above. The cavities 26 and 28 on the first side 24 of the adapter 12, and the cavities 48 and 50 on the second side 22 of the adapter 12, are shaped in a conventional manner to receive desired connector form factors, whether industry connector form factors (such as the LC or SC connectors mentioned above) and/or custom connector form factors. Portions 27 and 29 of respective cavities 26 and 28 serve to help retain an engaged connector within such cavities by means of, for example, a deformable connector retention latch 74 already known in the art, that engages and cooperates with such portions 27 and 29 so as to retain the connector within the cavity or cavities until the retention latch 74 is manually released by the system operator. Cavities 48 and 50 are also similarly configured for a connector retention latch of this same sort. The interior of the adapter 12 not shown in the figures, including in particular that interior portion of the adapter 12 between cavity 26 and cavity 50, for example, is designed and configured in a conventional manner already known in the art, so as to enable optical connectivity between each of the two optical fibers respectively terminated by respective connector portions received into these two aligned cavities. The same applies with respect to that interior portion of the adapter 12 between cavity 28 and cavity 58.

Importantly, and to ensure clarity, uses of the terms "body" and "body portion" as used throughout this disclosure are not intended to herein set forth new definitions for or ascribe particular limitations to the terms, neither with reference to the example embodiments disclosed herein nor otherwise. Accordingly, except as may be more narrowly specified herein in a particular given context, the term "body" as used herein in the context of a receptacle should at minimum be generally understood to include a given portion, and/or the whole, of either one structure that alone represents, and/or plural structures that together represent, a given portion and/or the whole of the receptacle device, in a traditional sense as is known to those skilled in the art. Moreover, the term "body portion" in the context of a receptacle device as described herein likewise generally should at minimum be understood to include a structural portion of the receptacle, regardless of whether such portion itself comprises a given portion, and/or the whole, of only one structure or plural structures of which a portion and/or the whole of the receptacle devices is comprised. Accordingly, the example embodiments set forth herein shall not operate to limit the scope of the invention to the extent the claims set forth below use the terms "body" and/or "body portion." The same is true with respect to other terms that may be used in the claims set forth below, such as for example and without limitation the terms "receptacle,"

"communication port connector receptacle," "communication port," "system," "cable connector," "light source," "optical detector," "light path," "optical path," "characteristic," "communicate," "pass," "component," and "engage/engaged/engagement," just to name a few.

Example adapter 12 further comprises optical, or light, paths 32 and 36 inserted and fixed during manufacture into cooperating recesses of the injection-molded body of adapter 12. Light paths 32 and 36 are formed from a material that passes light, such as for example a fiberglass or polymer material that results in at least semitransparent (e.g. translucent), or fully transparent, light paths. Other portions of the illustrated adapter 12, such as the body and latches for example, are opaque in this example embodiment. The light paths 32 and 36 can be affixed to the body of adapter 12 by methods known to those skilled in the art, for example by either a press-fit, or an adhesive, or a heat-fusing process.

As shown by the figures, light path 36 extends along a surface of the adapter 12, which for ease will be hereinafter referred to as a bottom surface of adapter 12 (using as a point of reference an orientation of the adapter 12 installed in a system module front panel, for example, wherein the latch 74 of a engaged connector 60 is oriented on the top of the connector when the connector is engaged at the adapter of the system module). In particular, light path 36 extends along the bottom surface of adapter 12 from an edge of the adapter 12 at end 22 to an edge of the adapter 12 at the other end 24 of the adapter 12, and more specifically, light path 36 extends to a first edge of notch 30 located at end 24. Notch 30 is the rectangular-shaped recess of the adapter body along the bottom surface of the adapter 12 that extends into the body and bottom surface of the adapter away from the center of the furthest edge of the adapter 12 at end 24.

Light path 32 extends from a second edge of notch 30, opposite from the end of light path 36, back to an edge of the adapter 12 at end 22. At the location of notch 30, each of light paths 36 and 32 are aligned with one another at end 24 and notch 30 along a first line that is parallel with the edge surface of adapter 12 at end 24, as well as along a second line that is within the plane of the bottom surface of adapter 12. This alignment allows light that exits light path 36 to enter light path 32 across notch 30, at least when such light paths 36 and 32 are optically more directly coupled with one another through an intervening light path portion, provided by a cable connector component of this example embodiment, that is similarly aligned and removably disposed in notch 30 between light paths 36 and 32 when the cable connector of this example embodiment is engaged at the adapter 12, as is further explained below. While at least some implementations of this particular example embodiment may not contemplate any optical coupling across the notch between light path 36 and light path 32 in the absence of an engaged cable connector, at least certain other implementations of this particular example embodiment may nevertheless still contemplate at least some optical coupling (e.g., over-air coupling), albeit a lesser degree of optical coupling, across the notch even in the absence of an engaged cable connector.

Light paths 36 and 32 are together, whether with or without the intervening cable connector component light path portion mentioned above, sometimes referred to herein as an optical path, and more particularly referred to for example as an optical path that extends between light source or emitter 90 and optical detector 92, and/or which extends from, or into which light passes from, the light source or emitter 90, and/or which extends to, or from which light passes to, the optical detector 92, as is more fully described below. However, any such reference to an "optical path" as used throughout this disclosure, including without limitation in the claims set forth below, is not intended to herein set forth a new definition for the term optical path, or ascribe particular limitations to the term optical path, neither with reference to the example embodiments disclosed herein nor otherwise. The example embodiments set forth herein therefore shall not operate to limit the scope of the present invention.

Figure 10:
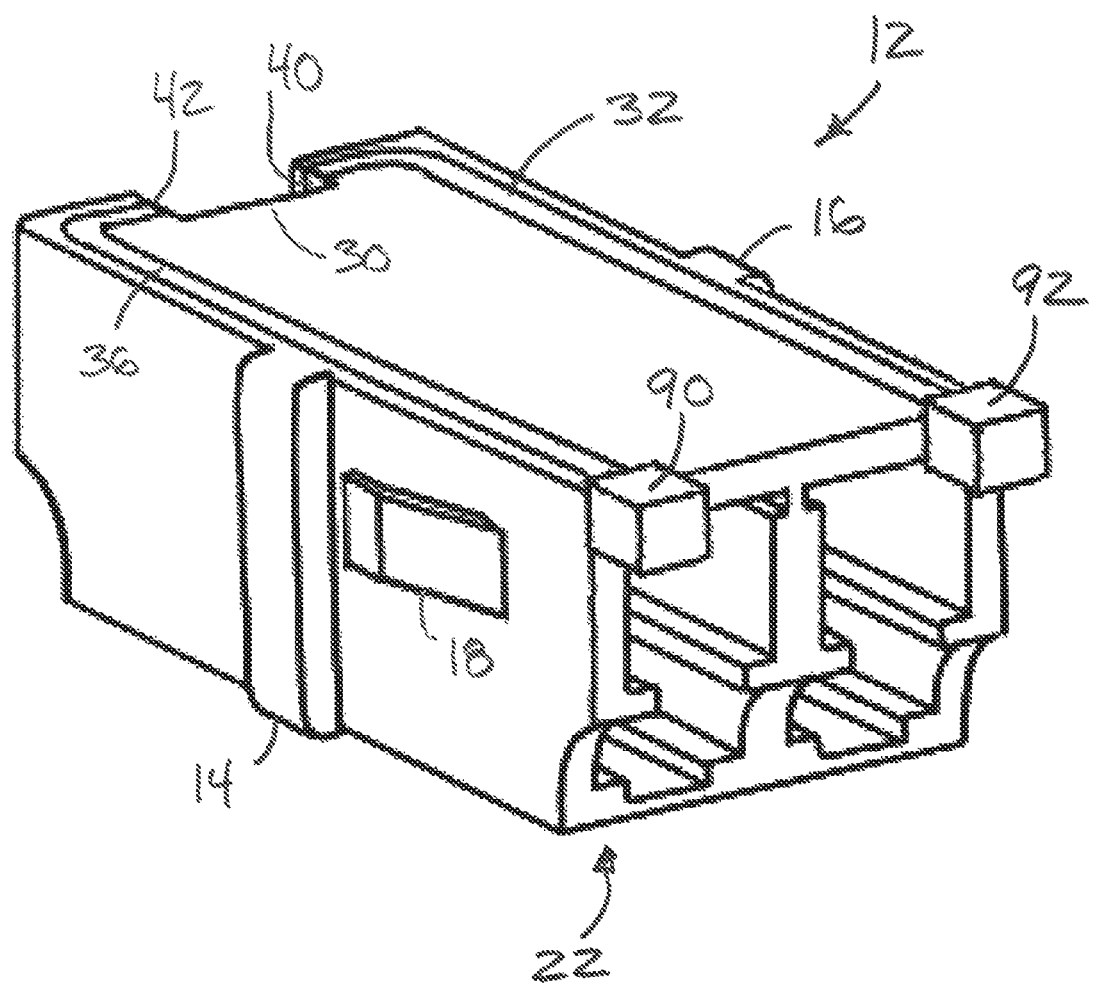
FIG. 10 is another top-down, underside perspective view from the second end of the adapter of the example embodiment shown in FIGS. 1-4, similar to FIG. 5, but this time further illustrating a respective schematic representation of each an emitter and a detector of the example embodiment.

In this example embodiment, end 22 of the adapter 12 is disposed adjacent a printed circuit board, for example a PCB of a system module that includes a face plate into which the adapter is retained. Located on the PCB is each of an optical source, such as for example a light emitter, or optical transmitter, as well as an optical detector, or receiver, which are each respectively represented schematically in FIGS. 10 and 11 for example as emitter 90 and detector 92. In this example embodiment, emitter 90 is disposed adjacent to and optically coupled with light path end surface 38 of light path 36, while detector 92 is disposed adjacent to and optically coupled with light path end surface 34 of light path 32. Accordingly, emitter 90 is adapted to emit/transmit light into light path 36 through end surface 38 and detector 92 is adapted to detect/receive light from light path 32 through end surface 34.

Figure 2:
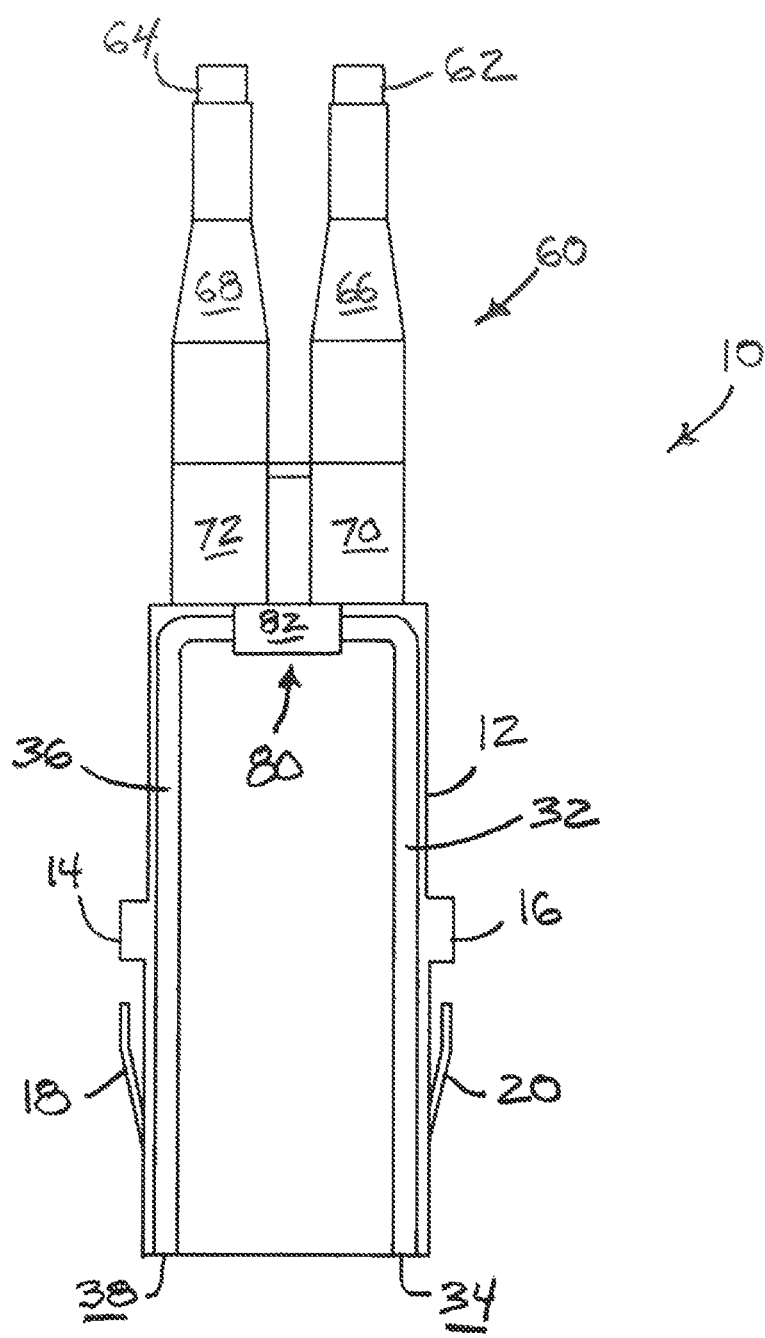
FIG. 2 is a plan view of the underside of the example embodiment shown in FIG. 1.
Figure 3:
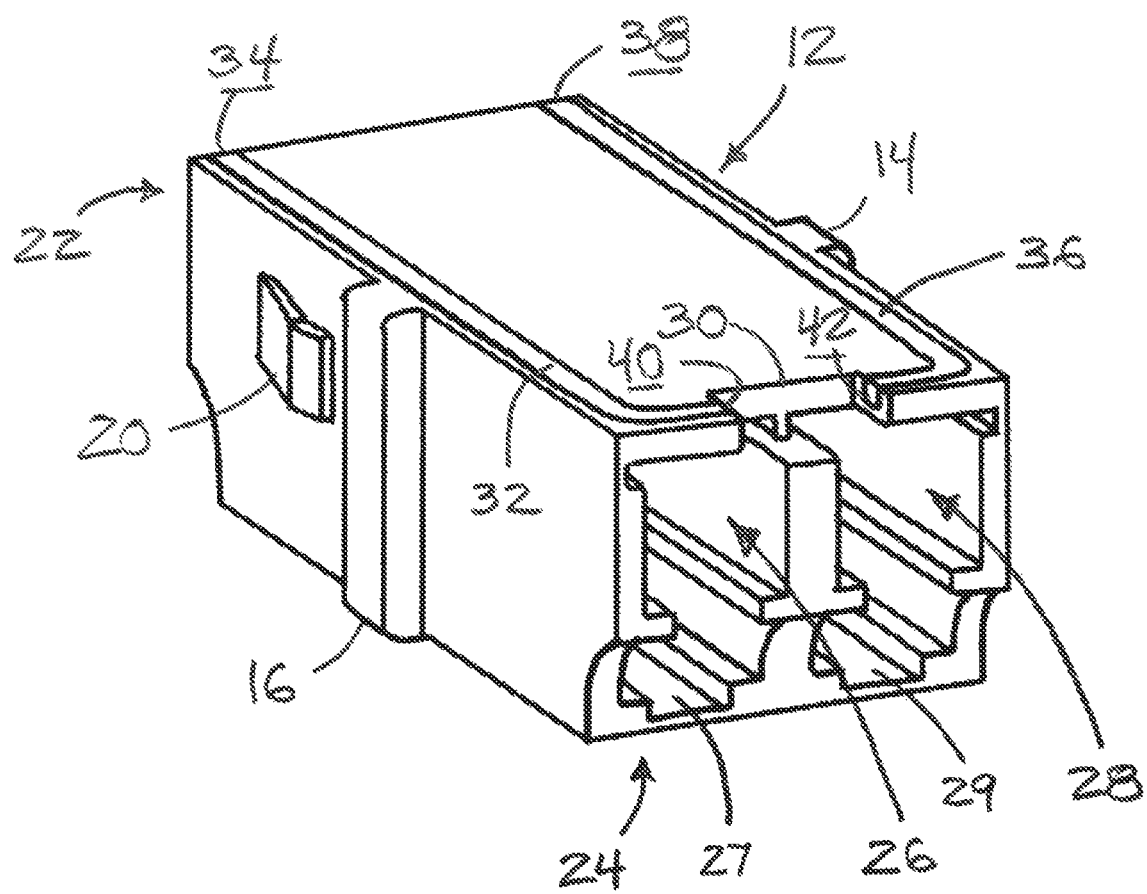
FIG. 3 is a top-down perspective view from the first end of the adapter of the example embodiment shown in FIGS. 1 and 2 (the adapter being overturned in FIG. 3 as compared to the orientation of the adapter illustrated in FIG. 1), without the received optical fiber pair and associated connector illustrated in FIGS. 1 and 2.
Figure 4:
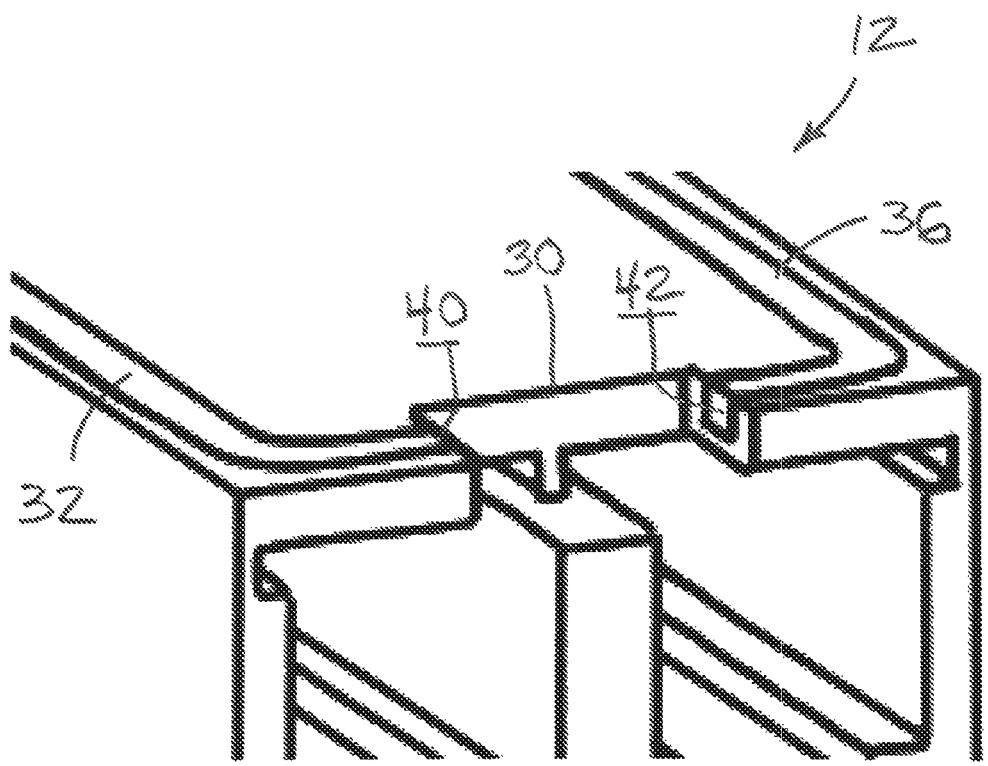
FIG. 4 is a close-up view of a portion of the illustration of FIG. 3, to provide a closer view of a notch portion of the adapter of the example embodiment shown in FIGS. 1-3.
Figure 5:
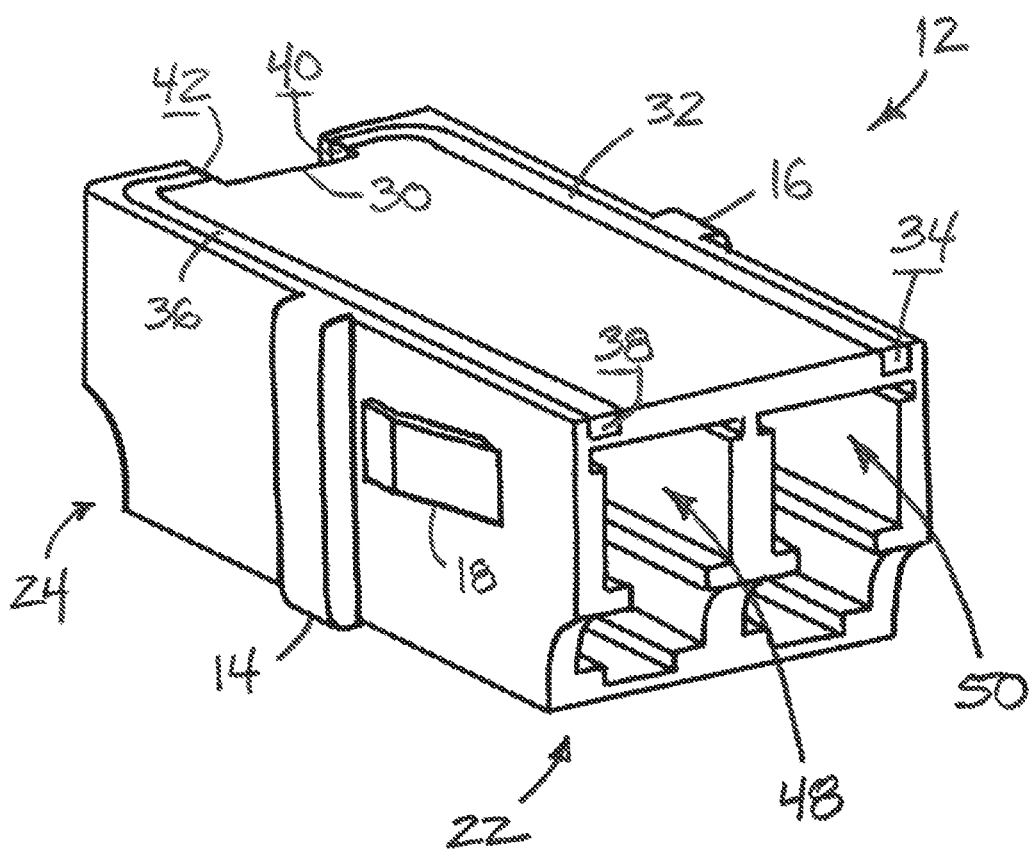
FIG. 5 is a top-down, underside perspective view from the second end of the adapter of the example embodiment shown in FIGS. 1-4, without any received optical fiber pairs or associated connectors.
Figure 6:
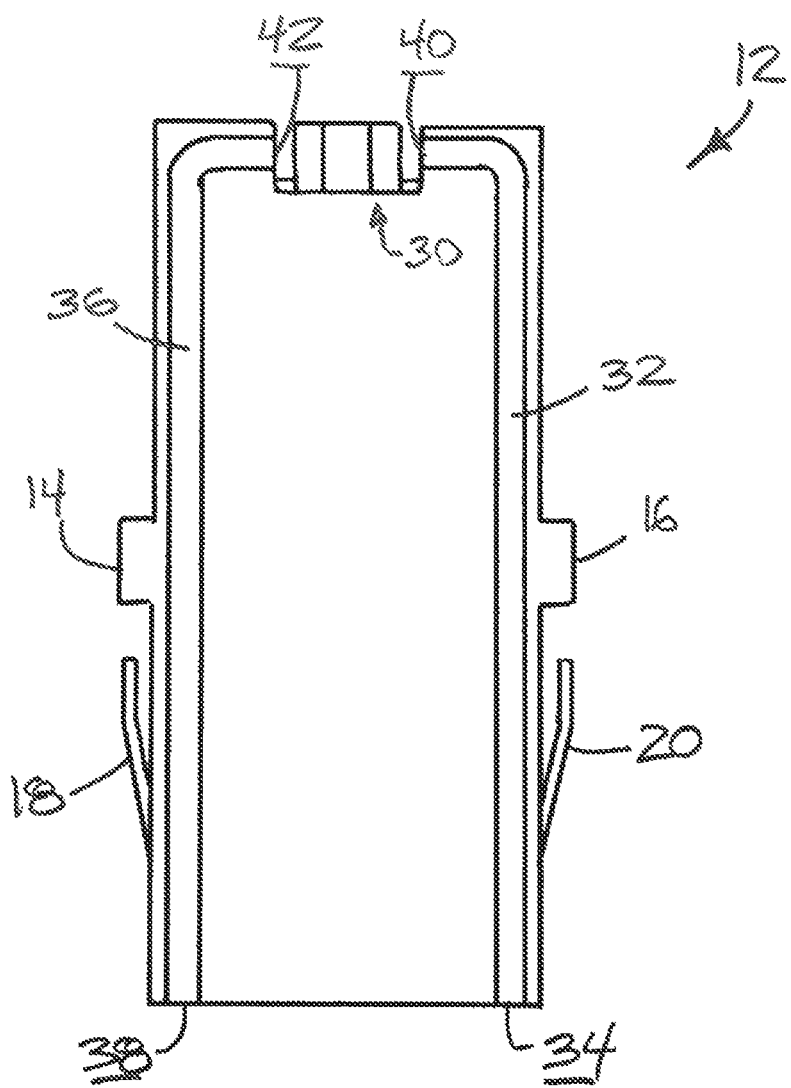
FIG. 6 is another plan view of the underside of the example embodiment shown in FIG. 1-5, this time without any received optical fiber pairs or associated connectors.
Figure 7:
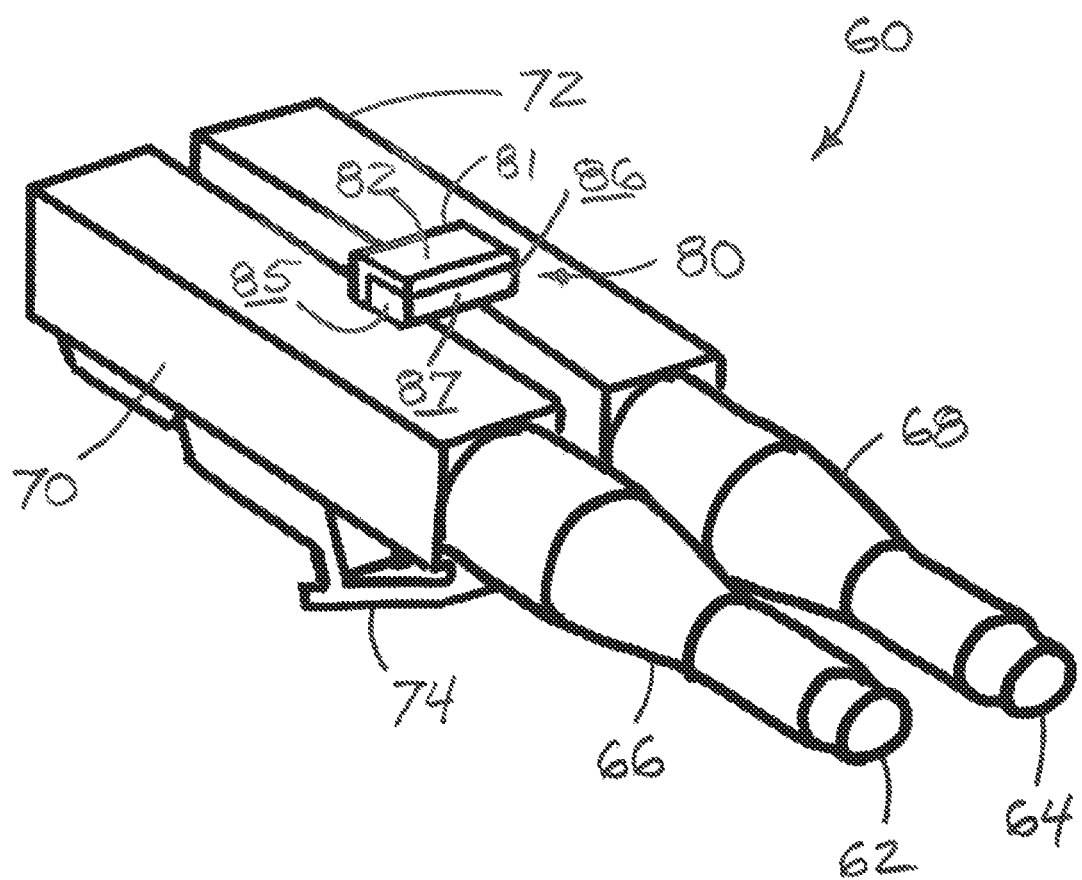
FIG. 7 is top-down perspective view of the example embodiment connector (and representative portions of associated optical fibers) illustrated in FIGS. 1 and 2 (the connector being overturned in FIG. 7 as compared to the orientation of the connector illustrated for example in FIG. 1).
Figure 8:
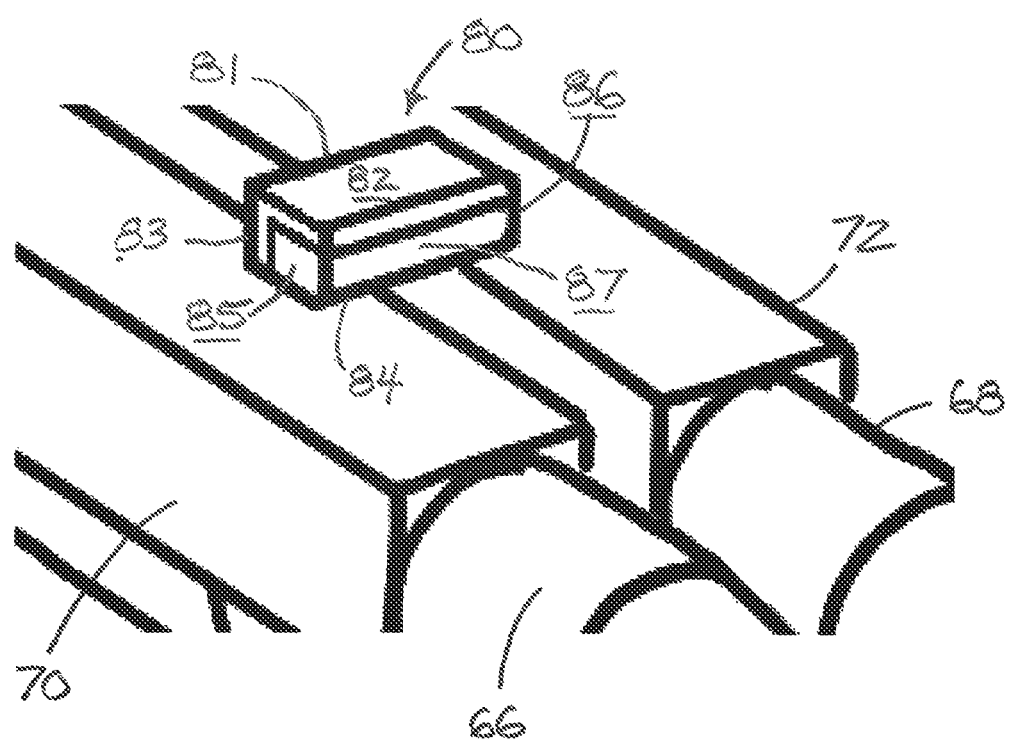
FIG. 8 is a close-up view of a portion of the illustration of FIG. 7, to provide a closer view of a component portion of the example embodiment connector shown in FIGS. 1, 2 and 7, which in this example embodiment is an optical component that may be adapted to pass light and illuminate.
Figure 9:
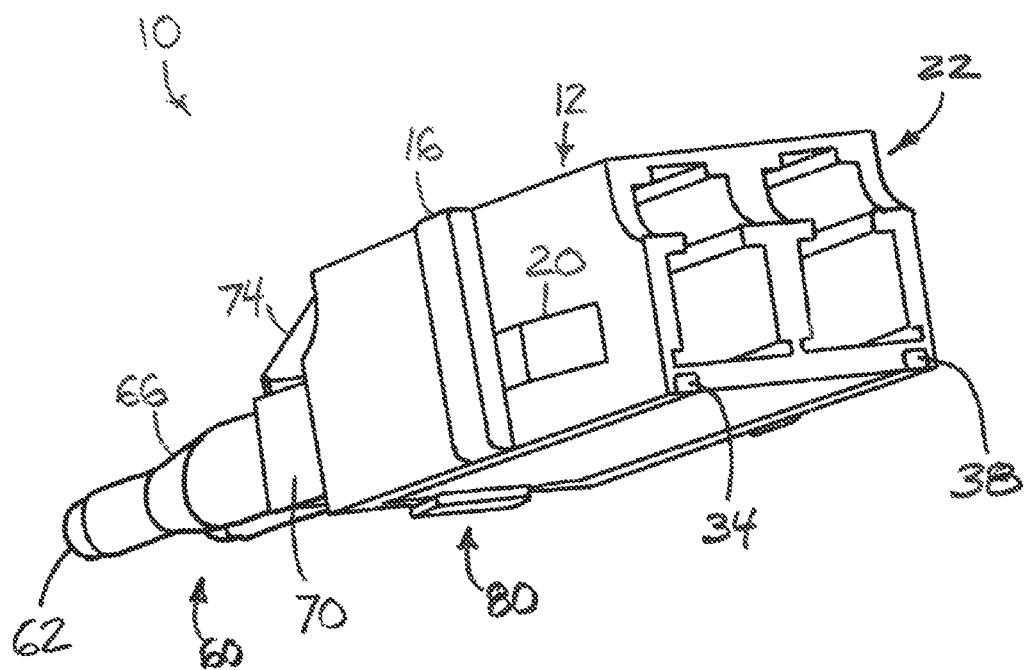
FIG. 9 is a bottom-up perspective view of the example embodiment of the present invention shown for example in FIGS. 1 and 2, illustrated in perspective in FIG. 9 from the second end of the adapter.
Figure 11:
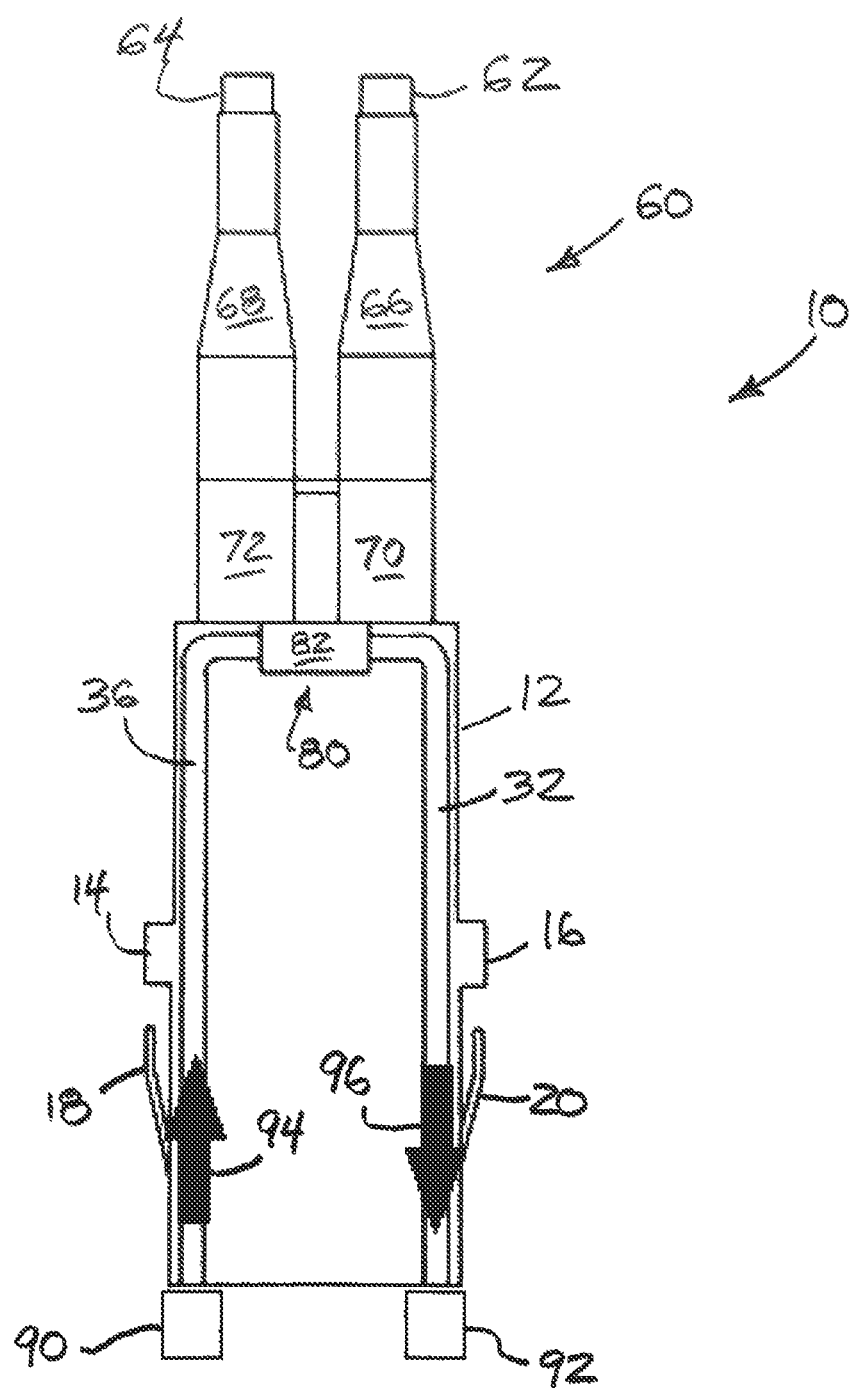
FIG. 11 is another plan view of the underside of the example embodiment shown for example in FIGS. 1-2, similar to the plan view of FIG. 2, but this time further illustrating a respective schematic representation of each a emitter and a detector of the example embodiment, as well as the direction of travel of light along an optical path of the example embodiment between the emitter and detector.

As is shown for example in FIGS. 1, 2 and 11, but perhaps best shown by FIGS. 7 and 8, this example embodiment of the present invention comprises example connector 60 which includes component 80, which is not a component of conventional optical connectors, even if for example the remaining portion of example connector 60 has a form factor that is otherwise consistent with prior art industry standard connectors. More specifically, example component 80 is a component of connector 60 that is disposed in a central portion of connector 60 between adapter body portions 70 and 72, on an underside of the connector 60 that is opposite a top side of the connector 60 where the latch 74 is located. Component 80 is a component of connector 60, and as a result it is introduced to the adapter 12 upon insertion of the connector 60 into adapter 12, and it is removed from cooperation with the adapter 12 upon removal of the connector 60 from adapter 12.

With further reference to FIG. 7, and especially FIG. 8 which is a close-up view of a portion of the connector 60 shown in FIG. 7, example component 80 comprises a rectangular light path 84 that, like light paths 32 and 36, is also formed from a fiberglass or polymer material that results in at least semitransparent, e.g. translucent, or fully transparent light path. Other portions of illustrated component 80, namely respective side portions 82 and 83 of partial enclosure 81, are opaque in this example embodiment. Partial enclosure 81 can also be formed from a fiberglass or polymer material that is affixed to connector 60 together with light path 84, or formed together with other adjacent body portions of connector 60 for example after which light path 84 is inserted and affixed into position. As a result, light that enters light path 84 through light path end surface 86 (obscured from view in FIG. 8, but will be understood to be a surface opposite and parallel to light path end surface 85 shown in FIG. 8), can communicate through light path 84 and exit light path end surface 85. Moreover, component 80, including light path 84, is disposed on connector 60 such that light path surfaces 86 and 85 are disposed adjacent to and align with respective light path end surfaces 42 and 40 of respective light paths 36 and 32, such that when connector 60 is in proper position within adapter 12, component 80 fits within notch 30 and light paths 36, 84 and 32 align along end 24 of adapter 12 so that light from emitter 90 that passes into light path 36 is enabled to communicate through a light path that in turn extends through light path 36 into and through light path 84, and in turn into and through light path 32, and all the way to the detector 92 when component 80 of connector 60 is in place within notch 30 of adapter 12. Conversely, light does not communicate at least in the same manner, if at all, between emitter 90 and detector 92 when the connector 60 is not placed within adapter 12 and, as a result, light path 84 is not in a position to facilitate any optical coupling between light paths 36 and 32 as it otherwise would when the connector 60 is engaged at the adapter 12. Although this example embodiment contemplates a configuration that comprises a receptacle notch and cooperating cable connector component adapted for a receptacle notch, the present invention is not so limited. Those skilled in the art will understand and appreciate that other cable connector—receptacle configurations are possible without departing from the spirit of the present invention.

As a result, the module can employ the emitter 90 and detector 92 to sense whether light path 84 is in place to further complete an optical path that thus extends between the emitter 90 and detector 92. The detector 92 can be used to sense different optical profiles that can distinguish between a first configuration on one hand, for example where the connector 60 is not in place or properly engaged at the adapter 12 so as to enable optical light path 84 of component 80 to facilitate an optical coupling between light paths 36 and 32, and a second configuration on the other hand, for example where the connector 60 is properly engaged at the adapter 12 and therefore optical light path 84 of component 80 is in place to facilitate, or further facilitate, an optical coupling of light paths 36 and 32.

In perhaps a most basic implementation of this example embodiment, an example system module in which the adapter 12 is located can use emitter 90, such as for example a light-emitting diode (LED) device or laser located on the system module PCB, to send light in the direction of arrow 94 (FIG. 11) along light path 36. Moreover the system module, through the use of detector 92 also located on the system module PCB, is capable of receiving light (emitted by emitter 90) from light path 32 that is returning to the PCB in the direction of arrow 96 (again, FIG. 11), such that the system module is thus capable of at least detecting or sensing a light profile that corresponds to the circumstance where light path 84 is in place within notch 30 to facilitate, or further facilitate, an optical coupling between light path 36 and light path 32, whether such facilitation for example is to provide an optical coupling or to at least further enhance such optical coupling. The system module can also be further capable of distinguishing the foregoing circumstance from at least one alternative state where a different light profile is received at detector 92 in the circumstance where the expected connector 60 is not in place in the adapter 12, whether such different light profile is for example an absence of light, or at least a distinguishably different light profile resulting from an absence of light path 84 between light paths 36 and 32.

In this way, this example embodiment of the present invention enables the module/system for example to determine whether a connector in accordance with the present invention is in place in the adapter. If it is determined that a connector is not in place for whatever reason, for example because a connector was not yet engaged at the port or an engaged connector was thereafter removed, the module/system is thus enabled to take appropriate steps in response. Such steps may include laser control, such as for example not enabling, or disabling, or powering-down in whole or in part, an associated laser that otherwise might transmit an optical communication signal at eye-hazardous power levels through an open cable connector or open port location.

Those skilled in the art will understand and appreciate that adapter 12 can be designed such that although notch 30 is adapted to receive component 80 as contemplated herein, adapter 12 nevertheless remains compatible with and capable of receiving more conventional connectors of the same form factor, such as for example an industry standard form factor, that do not further comprise a component 80 like that of the example embodiment of the present invention. Thus from a mechanical form-factor perspective, it is possible for adapter 12 to engage a connector 60 in the practice of the present invention, as well as to still alternatively engage a connector that does not practice the present invention. This makes it possible, if desired, to design and configure the associated module or system such that the protections and benefits provided by this invention could be overridden in an alternative configuration of the module or system such that it suspends any reliance on the feedback the module/system would otherwise receive in checking for or detecting the presence or receipt of component 80 in notch 30, or absence thereof.

Returning once again to the example embodiment of the present invention wherein connector 60 does comprise component 80, and with reference again to FIGS. 7 and 8, component 80 and in particular light path 84 is adapted such that light entering light path 84 at light path surface 86 not only emits from light path surface 85 into light path 32, but light also emits from light path surface 87 which is visible from a system operator side of the adapter 12 when the connector 60 is engaged at the adapter 12. As a result, at least a portion of any visible-spectrum light from emitter 90 that enters light path 84 of component 80 emits from light path surface 87 to illuminate the surface 87 to provide a visual indication to a system operator, such as for example a visual indication that confirms proper placement and system-acknowledged receipt or engagement of the connector at the port. The emitter 90 also could be adapted to transmit multiple different colors and/or patterns of light so as to be capable of communicating a plurality of alternative visual indicators to a system operator, such as for example alternative indications that a given engaged connector was not expected to be engaged in that particular port, or is not compatible with that particular port, or otherwise does not belong at that particular port, or conversely that the engaged connector is recognized and acknowledged by the system as properly engaged at the adapter or adapter location, or that acknowledges or confirms that the engaged connector is one of a certain type or class of connectors, or is detected by the system as being either operable or faulty, or otherwise requiring the attention of the system operator. From this disclosure, those skilled in the art will understand and appreciate that in this manner a wide variety of port-handling capabilities can be enabled by various embodiments of the present invention.

In more complex implementations of this example embodiment of the present invention, an alternative component to component 80 could comprise additional technology so as to enable additional functionalities. For example, an alternative connector could include a substitute component for component 80, which such substitute component not only similarly cooperates within notch 30 to provide light-coupling properties between light paths 36 and 32, but that further includes for example polarization-related properties (e.g., via one or more polarization filters), and/or spectral filtering properties (e.g., via one or more spectral filters), and/or selected fixed known light attenuators, such that the module/system can receive and detect, and thereby distinguish, light from light path 32 at finer levels of granularity.

Take for example a given adapter and module that are capable of receiving and operating with each of at least two different classes of optical connector having the same form factor. The connector of each of these two classes commonly includes a component that cooperates within notch 30 to provide or enhance optical coupling between light paths 36 and 32, consistent the earlier example embodiment discussed above. However, in this alternative example embodiment, assume for example that emitter 90 is for example a white LED that generates a white light that passes along light path 36, and as a result such white light is presented to a connector component located within notch 30 when a connector is present in the adapter. Also assume for example that detector 92 is fixedly tuned to detect and distinguish one or more spectral profiles in the light received from light path 32, or alternatively is capable of tunably sweeping across frequencies to detect a given spectral profile received from light path 32 from among a range of possible spectral profiles. Moreover, this alternative embodiment further comprises the use of alternative spectral filters in alternative connectors. More specifically, a spectral filter of the connector component that is received in notch 30, in the case of a first of the two classes of connectors, differs from the spectral filter of the corresponding component of the other class of connectors, so as to produce different, in other words distinguishable, spectral profiles—e.g., distinguishable alternative colors—in the light that is received from light path 32, depending upon which of the two classes of connector happens to be engaged at the adapter at that particular moment. The module/system in turn can, through a look-up table for example, cross-reference one or more attributes of the detected spectral profile to draw further conclusions about the engaged connector, which such further conclusions may allow the module/system to configure, or otherwise operate, the port, and/or the module, and/or the system for example, in a manner that is appropriate based upon the particular connector that in this manner has been identified as being engaged and then-present at that particular port.

In this way, these additional alternative features of the present invention can be used in at least certain embodiments to enable enhanced features, beyond those features that are enabled merely by a detection of an engagement, and/or an absence of engagement, of the connector at the adapter/receptacle. Such enhanced features for example arise from a module's or system's enhanced capability to recognize or identify a given engaged connector, connector type, connector class, or connector functionality, or an enhanced capability to at least distinguish a given engaged connector from one or more alternative connectors, connector types, connector classes, or connector functionalities— even under circumstances for example where such alternative connectors might share the same form factor. The modules and/or systems associated with such example connectors and receptacles thus can react to the engagement of such connectors in a myriad of ways not possible in the prior art, as will be understood and appreciated by those skilled in the art.

FIG. 12 shows an example communication system card, or module, 100 that comprises a front panel or faceplate 102 through which adapter 12 is received and affixed to the module 100. Module 100 further comprises a PCB 104 that extends adjacent adapter 12 and perpendicular to faceplate 102. Emitter 90 is located on the PCB, adjacent the second end 22 of adapter 12 as described above in more detail in relation to earlier Figures. Emitter 90 is driven and controlled by emitter driver and control circuitry, schematically depicted by block 106, which connects to emitter 90 through one or more connections schematically depicted for ease of reference in the Figure as connection 108. Detector 92 is also located on the PCB, adjacent the second end 22 of adapter 12 as described above in more detail in relation to earlier Figures. Information provided by detector 92, with respect to detected light received from light path 32, is further processed by circuitry or subsystem 114, which connects to detector 92 through one or more connections schematically depicted for ease of reference in the Figure as connection 112. Circuitry or subsystem 114 can also configure, drive and/or control optical detector 92, to the extent any of the foregoing may be necessary or appropriate for a given implementation of this example embodiment, which such capabilities are schematically represented in FIG. 12 at block 110.

Subsystem 114 in this example embodiment further comprises a processor 116, a memory 118, a storage device 120, and an input/output interface 122. Of course, subsystem 114 need not be a separate subsystem, nor need it be dedicated to the function of detection of communication cable connectors or connector engagement/disengagement, insofar as such functionality could be carried out using module or system components that in addition serve other features and functions of the module 100. Each of the components 116, 118, 120 and 122, as well as the capabilities and underlying components represented by block 110, can be interconnected, for example, by a subsystem bus 124. The processor 116 is capable of processing instructions for execution within the subsystem 114. In some example embodiments, the processor 116 is a single-threaded processor, a multi-threaded processor, or another type of processor. The processor 116 is capable of processing instructions stored in the memory 118 or on the storage device 120. The memory 118 and the storage device 120 can store information within the subsystem 114. Subsystem 114 may be adapted, for example, to translate the presence or absence of detected light, and/or certain identifying or distinguishing aspects of the light that is detected, or not detected, at detector 92. Such translation can, for example through the use of a stored look-up table or other cross-reference mechanism, associate certain detected light characteristics with connector engagement or disengagement, or with certain connectors or connector types, or with certain other connector, port, module or system status, for example. Such translation can be more meaningful to a system operator, for example, when as a result of the translation the system operator is presented with corresponding light indications (for example, at component surface 87) or other system messages that convey information of importance to the system operator, that the system is adapted to provide in response to such translation.

The input/output interface 122 can for example include driver devices configured to receive input data and send output data, separately or collectively, to other input/output devices, e.g., other system components such as components that enable, disable, modify the operation of, and/or otherwise control, a communication signal laser associated with the port location at adapter 12. Input/output interface 122 could instead, or additionally, communicate (using one or more connections schematically depicted for ease of reference in the Figure as connection 128) with other system components that relate directly or indirectly to the port location at adapter 12, or otherwise relate to port, module, device, or system handling, administration or other management. All such possible system components are, for ease of illustration and reference, schematically illustrated collectively in box 126 of FIG. 12, although it will be understood that input/output interface 122 is not limited to any one such system component, and that input/output interface 122 can separately communicate with each of a plurality of system components relating to port connector engagement and/or other aspects of port handling, port administration, and/or other port management.

Figure 13:
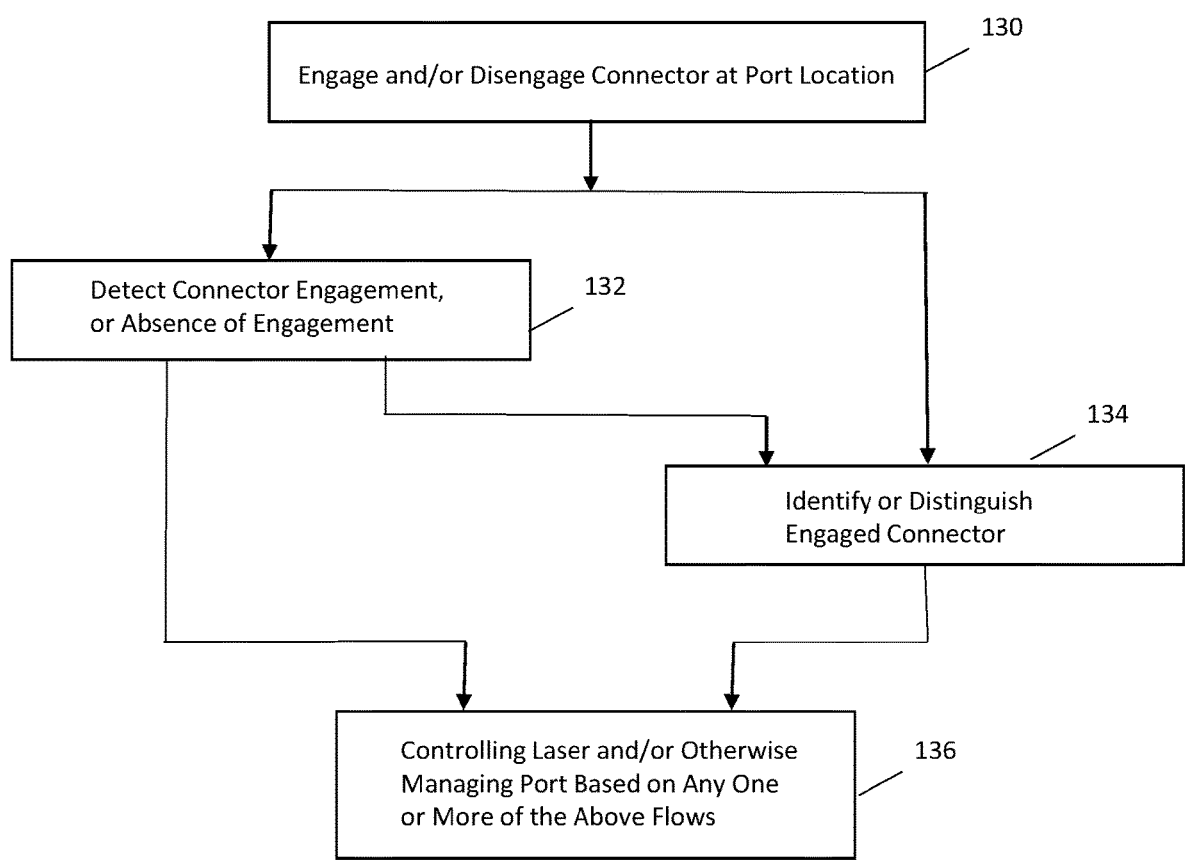
FIG. 13 is an illustrative flow diagram of an example embodiment of the method of the present invention.

FIG. 13 illustrates an example embodiment method of the present invention. In this example, at step 130 a communication cable connector is engaged, or disengaged, at the communication port location presented by an adapter, or more generally a receptacle, of the present invention. In one scenario, at step 132 the module or system detects either or both the engagement of the cable connector (in the case the cable connector is engaged at the communication port connector receptacle) and/or the absence of engagement of the cable connector (in the case the cable connector was not yet engaged with, or is disengaged from, the communication port connector receptacle). Moreover, instead of and/or in addition to step 132, at step 124 the module or system identifies, or at least distinguishes, the cable connector engaged at the communication port connector receptacle. At step 136, the module or system for example enables, disables, modifies the operation of, and/or otherwise controls, a communication laser associated with the port location under consideration. At step 136, the module or system for example might instead, or additionally, take other responsive action related directly or indirectly to the port location under consideration, or otherwise related to port, module, or system handling, administration or other management.

In relation to the example method of the present invention described above, the example communication cable connectors, the communication port connector receptacles, the light source or emitter, the optical detector, and the other aspects of the example system described in herein, can be used for example in the execution of the example method.

While this invention has been particularly shown and described with references to example embodiments thereof, it will be understood by those skilled in the art that various changes in form and details may be made therein without departing from the scope of the invention encompassed by the claims set forth below.

While each of the example embodiments of the invention illustrated herein are depicted as comprising an optical fiber receptacle and one or more optical fiber connectors, with the benefit of the figures and other disclosure provided herein it will be understood by those skilled in the art that the present invention is not limited to optical applications, nor to receptacles of the adapter type illustrated in the Figures. Moreover, the present invention is also not limited to applications that involve communication system modules. Moreover, the example embodiments described above contemplate an emitter and detector combination that is located external to the receptacle, in that they both reside on the example module PCB rather than on or within the adapter or receptacle itself. The present invention is not so limited, however. The example embodiment of the present invention described herein could instead be implemented using an on-board emitter and detector on the receptacle so as to emit and detect light in this respect without reliance from a separate emitter and detector. Certain alternative embodiments may also relate to other receptacle types and form factors beyond the adapter 12 described herein, and certain alternative embodiments may contemplate other forms and form factors of cable connector—receptacle engagement, beyond the cable connector/receptacle cavity and/or connector component—receptacle notch forms and form factors illustrated and described herein.

From the foregoing disclosure, it will be understood and appreciated by those skilled in the art that the present invention provides improved solutions for the interconnection of a connector and a cooperating receptacle, and more generally, for improved handling and management of communication connectors and communication ports.

Certain example embodiments of the present invention for example contemplate a system for a communication port, comprising a cable connector adapted to terminate a communication cable that establishes a first communication path that terminates at the cable connector, a communication port connector receptacle that is adapted to removably engage and communicatively couple with the cable connector to establish a communication port connection between the first communication path and a second communication path that terminates at the communication port connector receptacle, a light source, and an optical detector. The communication port connector receptacle in this example embodiment further comprises an optical path into which the system is adapted to, in at least one state of the system, pass light from the light source and from which the system is adapted to, in at least one state of the system, pass light to the optical detector. As shown in the Figures, this optical path of this example embodiment is separate from each of the first communication path, the second communication path, and the communication port connection. The system is adapted to use the optical path, the light source, the optical detector, and a component of the cable connector, to detect an engagement of the cable connector at the communication port connector receptacle, and/or an absence of engagement of the cable connector at the communication port connector receptacle, and/or a characteristic of the cable connector communicatively coupled with the communication port connector receptacle.

The system of this example embodiment can be adapted to detect an engagement of the cable connector at the communication port connector receptacle by recognizing a detected presence of light passing from the optical path to the optical detector, and/or to detect an absence of engagement of the cable connector at the communication port connector receptacle by recognizing an absence of detected light passing from the optical path to the optical detector. An optical coupling of the optical path by connector component 80, for example, enable such a presence and absence of detected light. Alternatively, however, an opaque connector component for example could instead serve to, when the corresponding connector is engaged with the receptacle, disrupt in whole or in part an otherwise complete optical path of the receptacle when the connector is not engaged with the receptacle. In this alternative example, the system can be alternatively adapted to detect an engagement of the cable connector at the communication port connector receptacle by recognizing an absence of, or a diminished amount of, detected light passing from the optical path to the optical detector, and to detect an absence of engagement of the cable connector at the communication port connector receptacle by recognizing a detected presence, or increased presence, of light passing from the optical path to the optical detector.

Example embodiments of systems of the present invention can be adapted to pass light to the optical detector from the optical path each during an engagement of the cable connector at the communication port connector receptacle and in an absence of engagement of the cable connector at the communication port connector receptacle, and wherein light detected during the cable connector engagement differs in at least one characteristic from light detected in the absence of engagement of the cable connector at the communication port connector receptacle. The system can detect such differences and administer the port accordingly, to for example identify whether the connector is properly engaged.

More generally, embodiments can also be adapted so that an engagement of the cable connector at the communication port connector receptacle alters at least one characteristic of the optical path as compared to the optical path in an absence of engagement of the cable connector at the communication port connector receptacle. The at least one characteristic of the optical path that could be altered, for example, is a degree of optical coupling along the optical path between a first portion of the optical path that extends from the light source (e.g., light path 36) and a second portion of the optical path that extends towards the optical detector (e.g., light path 32). The degree of optical coupling could range for example from an undetectable level or no optical coupling, when the cable connector is not engaged at the communication port connector receptacle, to at least some detectable optical coupling when the cable connector is engaged at the communication port connector receptacle. The degree of optical coupling could also range from a first degree of optical coupling that enables the passage of light to the optical detector at a first detectable level when the cable connector is not engaged at the communication port connector receptacle, to a second degree of optical coupling that enables the passage of light to the optical detector at a second detectable level when the cable connector is engaged at the communication port connector receptacle, wherein the second degree of optical coupling is greater than the first degree of optical coupling, and wherein the second detectable level is greater than the first detectable level. Other varying degrees, or amounts or extents, of optical coupling are of course possible, so long as differences are detectable by the system between one state of connector engagement and another, or between different connectors, or connector types or classes, for example.

Such at least one characteristic that is altered can instead or additionally be an amount of optical attenuation along the optical path between a first portion of the optical path that extends from the light source and a second portion of the optical path that extends towards the optical detector, and/or a characteristic that relates to at least one of polarization filtering and spectral filtering. For example, a component that fits into notch 30 of example embodiment adapter 12 could provide certain attenuation, and/or polarization filtering, and/or spectral filtering, to result in an optical profile that is received by detector 92 and detected by the system so as provide an indication as to connector engagement and/or absence of connector engagement, and/or as to the identity of the engaged connector or connector type or class, for example. To further illustrate, certain example embodiments can be adapted to detect a distinguishing attenuation profile, and/or polarization characteristic, and/or spectral characteristic, of light that passes to the optical detector from the optical path during an engagement of an cable connector (or alternatively absence of engagement) at the communication port connector receptacle, or during an engagement of a particular one, or type or class, of a cable connector at the communication port connector receptacle, for example as a result of a connector component that, like component 80 described above, cooperates or otherwise interacts with or influences the optical path. Conversely, the same distinguishing attenuation profile, and/or polarization characteristic, and/or spectral characteristic is not similarly detected by the system relative to the communication port in an absence of engagement (or alternatively an engagement) of the cable connector at the communication port connector receptacle (or during an engagement of another particular one, or type or class, of a cable connector). In this latter configuration, namely in an absence of engagement (or alternatively an engagement), it may be for example that either no attenuation profile, and/or no polarization characteristic, and/or no spectral characteristic is detected, or that an attenuation profile, and/or polarization characteristic, and/or spectral characteristic is instead detected that differs in at least one respect from that which is detected in the former configuration, so as to enable one connector to be identified, or at least distinguished from another connector, or connector type or class, for example.

Under appropriate circumstances, such as for example a disengagement of a cable connector from a port location, the example system described herein can detect such circumstances and in certain embodiments, in response to such detection the system can in turn, through for example a controller (e.g., a laser control consistent with block 126 of FIG. 12), power-down or turn-off a laser that is otherwise adapted to transmit optical communication signals through or to the port, and/or a cable of the associated cable connector, at eye-hazardous levels. Similarly, a controller can be used to verify an engagement of a cable connector at a given port prior to enabling a laser to communicate optical signals through or to the port, and/or a cable of the associated cable connector, at eye-hazardous levels.

While this specification contains many details, these should not be construed as limitations on the scope of what may be claimed, but rather as descriptions of features specific to particular non-limiting examples. Certain features that are described in this specification in the context of separate implementations can also be combined. Conversely, various features that are described in the context of a single implementation can also be implemented in multiple embodiments separately or in any suitable sub-combination.

While this invention has been particularly shown and described with references to example embodiments thereof, it will be understood by those skilled in the art that various changes in form and details may be made therein without departing from the scope of the invention encompassed by the claims set forth below.

What is claimed is:

1. A system, comprising:
 a cable connector disposed at an end of a communication cable, the communication cable establishing a first communication path that extends from the cable connector, the cable connector establishing a first portion of an optical path;
 a communication port connector receptacle operable to removably engage and communicatively couple with the cable connector to enable a communication port connection between the first communication path and a second communication path that extends from the communication port connector receptacle, the communication port connector receptacle establishing a second portion of the optical path;
 a light source; and
 an optical detector;
 wherein when the cable connector is removably engaged with the communication port connector receptacle, the first portion of the optical path optically aligns with the second portion of the optical path and the system is operable to pass light from the light source through each of the first portion of the optical path and the second portion of the optical path to the optical detector in at least one state of the system;

wherein the optical path is separate from each of the first communication path, the second communication path, and the communication port connection; and wherein, using at least a portion of the optical path, the light source, and the optical detector, the system is operable to detect at least one of:

an engagement of the cable connector with the communication port connector receptacle;

an absence of engagement of the cable connector with the communication port connector receptacle; and a characteristic of the cable connector engaged with the communication port connector receptacle.

2. The system of claim 1, wherein the system is operable to detect an engagement of the cable connector with the communication port connector receptacle by detecting light passing from the optical path to the optical detector.

3. The system of claim 1, wherein the system is operable to detect an absence of engagement of the cable connector with the communication port connector receptacle by recognizing an absence of detected light passing from the optical path to the optical detector.

4. The system of claim 1, wherein the system is operable to pass light to the optical detector from the optical path each during an engagement of the cable connector with the communication port connector receptacle and in an absence of engagement of the cable connector with the communication port connector receptacle, and wherein light from the optical path detected by the optical detector during the engagement of the cable connector with the communication port connector receptacle differs in at least one characteristic that the system is configured to detect as compared to light from the optical path detected by the optical detector in the absence of engagement of the cable connector with the communication port connector receptacle.

5. The system of claim 1, wherein the system is operable so that an engagement of the cable connector with the communication port connector receptacle alters at least one characteristic of the optical path that the system is configured to detect as compared to the optical path in an absence of engagement of the cable connector with the communication port connector receptacle.

6. The system of claim 5, wherein the at least one characteristic of the optical path that is altered is a degree of optical coupling along the optical path between a portion of the optical path that extends from the light source and another portion of the optical path that extends towards the optical detector.

7. The system of claim 6, wherein the degree of optical coupling ranges from an undetectable level of or no optical coupling, when the cable connector is not engaged with the communication port connector receptacle, to at least some detectable optical coupling when the cable connector is engaged with the communication port connector receptacle.

8. The system of claim 6, wherein the degree of optical coupling ranges from a first degree of optical coupling that enables light to pass to the optical detector from the optical path at a first detectable level when the cable connector is not engaged with the communication port connector receptacle, to a second degree of optical coupling that enables light to pass to the optical detector from the optical path at a second detectable level when the cable connector is engaged with the communication port connector receptacle, wherein the second degree of optical coupling is greater than the first degree of optical coupling, and wherein the second detectable level is greater than the first detectable level.

9. The system of claim 5, wherein the at least one characteristic of the optical path that is altered is an amount of optical attenuation along the optical path between a portion of the optical path that extends from the light source and another portion of the optical path that extends towards the optical detector.

10. The system of claim 5, wherein the at least one characteristic of the optical path that is altered relates to at least one of polarization filtering and spectral filtering.

11. The system of claim 1, wherein the system is operable to detect a distinguishing polarization characteristic of light that passes to the optical detector from the optical path during an engagement of the cable connector with the communication port connector receptacle, wherein the distinguishing polarization characteristic is not detected by the system in an absence of engagement of the cable connector with the communication port connector receptacle.

12. The system of claim 1, wherein the cable connector is a first cable connector among a plurality of cable connectors that the system comprises and with which the communication port connector receptacle is operable to alternatively engage, each respective one of the plurality of cable connectors establishing a respective optical path portion that is the second portion of the optical path when the respective cable connector is removably engaged with the communication port connector receptacle, and wherein, using the optical path, the light source, and the optical detector, the system is operable to distinguish the first cable connector from a second cable connector among the plurality of cable connectors that is not the first cable connector, and wherein to distinguish the first cable connector from the second cable connector, the system is operable to detect, in light that passes from the light source to the optical detector through each of the first portion of the optical path and the second portion of the optical path during a removable engagement of the first cable connector with the communication port connector receptacle, a polarization characteristic that differs in at least one respect from a polarization characteristic that the system is operable to alternatively detect in light that alternatively passes from the light source to the optical detector through each of the first portion of the optical path and the second portion of the optical path during a removable engagement of the second cable connector with the communication port connector receptacle.

13. The system of claim 1, wherein the system is operable to detect a distinguishing spectral characteristic of light that passes to the optical detector from the optical path during an engagement of the cable connector with the communication port connector receptacle, wherein the distinguishing spectral characteristic is not detected by the system in light that passes to the optical detector from the optical path in an absence of engagement of the cable connector with the communication port connector receptacle.

14. The system of claim 1, wherein, using the optical path, the light source, and the optical detector, the system is operable to distinguish a first cable connector from a second cable connector with which the communication port connector receptacle is further operable to engage alternatively to the first cable connector, and wherein to distinguish the first cable connector from the second cable connector, the system is operable to detect, in light that passes to the optical detector from the optical path during an engagement of the first cable connector with the communication port connector receptacle, a spectral characteristic that differs in at least one respect from a spectral characteristic that the system is operable to alternatively detect in light that alternatively passes to the optical detector from the optical path during an engagement of the second cable connector with the communication port connector receptacle.

15. The system of claim 1, wherein the system is further operable so that a detection, of at least one of an engagement of the cable connector with the communication port connector receptacle and an absence of engagement of the cable connector with the communication port connector receptacle, causes a change in state of a laser operable to communicate an optical signal through at least one of the first communication path and the second communication path.

16. A system, comprising:
a fiber optic cable connector disposed at an end of a fiber optic communication cable, the fiber optic communication cable establishing a first optical communication path that extends from the fiber optic cable connector, and the fiber optic cable connector establishing a first portion of an optical path;
an optical communication port connector receptacle operable to removably engage and communicatively couple with the fiber optic cable connector to enable an optical communication port connection between the first optical communication path and a second optical communication path that extends from the optical communication port connector receptacle, the optical communication port connector receptacle establishing a second portion of the optical path;
a light source; and
an optical detector;
wherein when the fiber optic cable connector is removably engaged with the optical communication port connector receptacle, the first portion of the optical path optically aligns with the second portion of the optical path and the system is operable to pass light from the light source through each of the first portion of the optical path and the second portion of the optical path to the optical detector in at least one state of the system;
wherein the optical path is separate from each of the first optical communication path, the second optical communication path, and the optical communication port connection;
wherein the system is operable to detect at least one of:
an engagement of the fiber optic cable connector with the optical communication port connector receptacle; and
an absence of engagement of the fiber optic cable connector with the optical communication port connector receptacle; and
wherein the system is operable to accomplish the detection by performing at least one of the following steps:
detecting a presence of light communicated along the optical path from the light source to the optical detector; and
detecting an absence of light communicated along the optical path from the light source to the optical detector; and
detecting a change in at least one characteristic of light communicated along the optical path from the light source to the optical detector.

17. A method, comprising:
a first step comprising at least one of:
engaging a communication cable connector with a communication port connector receptacle; and
disengaging a communication cable connector from a communication port connector receptacle; and
detecting at least one of:
an engagement of the communication cable connector with the communication port connector receptacle; and
an absence of engagement of the communication cable connector with the communication port connector receptacle;
wherein the communication cable connector is operable to removably engage and communicatively couple with the communication port connector receptacle;
wherein the communication cable connector is disposed at an end of a communication cable, the communication cable establishing a first communication path that extends from the communication cable connector;
wherein the communication cable connector establishes a first portion of an optical path;
wherein the communication port connector receptacle is operable to establish through the communication port connector receptacle a communication port connection between the first communication path and a second communication path that extends from the communication port connector receptacle;
wherein the communication port connector receptacle establishes a second portion of the optical path;
wherein when the communication cable connector is removably engaged with the communication port connector receptacle, the first portion of the optical path optically aligns with the second portion of the optical path and the system is operable in at least one state of the system to pass light from a light source, through each of the first portion of the optical path and the second portion of the optical path to an optical detector;
wherein the optical path is separate from each of the first communication path, the second communication path, and the communication port connection; and
wherein the detecting step comprises detecting at least one of:
a presence of light communicated along the optical path from the light source to the optical detector,
an absence of light communicated along the optical path from the light source to the optical detector,
a change in at least one characteristic of light communicated along the optical path from the light source to the optical detector.

18. The method of claim 17, wherein the detecting step further comprises using the optical path, the light source, the optical detector, and a component of the communication cable connector, to distinguish a first communication cable connector from a second communication cable connector with which the communication port connector receptacle is operable to communicatively couple, by detecting, in light that passes to the optical detector from the optical path during an engagement of the first communication cable connector with the communication port connector receptacle or, a spectral characteristic that differs in at least one respect from a spectral characteristic that is alternatively detected in light that alternatively passes to the optical detector from the optical path during an engagement of the second communication cable connector with the communication port connector receptacle.

19. The method of claim 17, further comprising the step of controlling a state of a laser based upon a result of the detecting step, wherein the laser is operable to communicate an optical signal through at least one of the first communication path and the second communication path.

20. The system of claim 1, wherein the cable connector is a first cable connector among a plurality of cable connectors that the system comprises and with which the communication port connector receptacle is operable to alternatively engage, each respective one of the plurality of cable connectors establishing a respective second portion of the optical path when the respective cable connector is removably engaged with the communication port connector receptacle, and wherein, using the optical path, the light source, and the optical detector, the system is operable to distinguish the first cable connector from a second cable connector among a plurality of cable connectors, and wherein to distinguish the first cable connector from the second cable connector, the system is operable to detect, in light that passes to the optical detector from the optical path during an engagement of the first cable connector with the communication port connector receptacle, an optical characteristic that differs in at least one respect from a an optical characteristic that the system is operable to alternatively detect in light that alternatively passes to the optical detector from the optical path during an engagement of the second cable connector with the communication port connector receptacle.

\* \* \* \* \*